US011829278B2

(12) United States Patent
K et al.

(10) Patent No.: US 11,829,278 B2
(45) Date of Patent: Nov. 28, 2023

(54) SECURE DEBUGGING IN MULTITENANT CLOUD ENVIRONMENT

(71) Applicant: SAP SE, Walldorf (DE)

(72) Inventors: Umesh K, Bangalore (IN); Jovin Jijo, Thrissur (IN); Anirudh Prasad, Perinthalmanna (IN); Mohit V Gadkari, Bangalore (IN); Christian Weiss, Speyer (DE)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 17/553,432

(22) Filed: Dec. 16, 2021

(65) Prior Publication Data

US 2023/0134277 A1 May 4, 2023

(51) Int. Cl.
  *G06F 9/44* (2018.01)
  *G06F 11/36* (2006.01)
  *G06F 9/455* (2018.01)

(52) U.S. Cl.
  CPC ...... *G06F 11/3636* (2013.01); *G06F 9/45558* (2013.01); *G06F 11/3664* (2013.01); *G06F 11/3696* (2013.01); *G06F 2009/45562* (2013.01)

(58) Field of Classification Search
  CPC .......................... G06F 11/3636; G06F 11/3664
  See application file for complete search history.

(56) References Cited

U.S. PATENT DOCUMENTS

| 6,990,657 B2 * | 1/2006 | Hunter | G06F 11/364 717/124 |
| 9,760,472 B2 | 9/2017 | Batsdorff et al. | |
| 10,073,759 B2 | 9/2018 | Cook et al. | |
| 11,405,272 B1 * | 8/2022 | Khan | H04L 41/0627 |
| 2005/0091520 A1 * | 4/2005 | Khan | G06F 11/3648 717/125 |
| 2006/0015741 A1 * | 1/2006 | Carroll | H04L 63/101 713/182 |

(Continued)

OTHER PUBLICATIONS

"Call stack," Wikipedia, https://en.wikipedia.org/wiki/Call_stack, printed Oct. 22, 2021, 8 pages.

(Continued)

*Primary Examiner* — Hang Pan
(74) *Attorney, Agent, or Firm* — Klarquist Sparkman, LLP

(57) ABSTRACT

A method for secure debugging in a multitenant cloud environment where an application server maintains a host application shared by multiple tenant users can be implemented. The method can receive a request from a tenant user to debug the host application associated with a tenant user, and responsive to the request, deploy an application runtime environment comprising an application container encapsulating the host application associated with the tenant user and a debugger container encapsulating a debugging software running on the application server. The method can set at least a breakpoint in source code of the host application through a user interface of the debugging software, run the host application associated with the tenant user in the application runtime environment, and evaluate an expression entered through the user interface of the debugging software after the host application associated with the tenant user hits the breakpoint.

21 Claims, 8 Drawing Sheets

(56) References Cited

U.S. PATENT DOCUMENTS

| | | | | |
|---|---|---|---|---|
| 2007/0157174 | A1* | 7/2007 | Gebhardt | G06F 11/3624 |
| | | | | 717/124 |
| 2012/0042218 | A1 | 2/2012 | Cinarkaya et al. | |
| 2012/0102464 | A1* | 4/2012 | Bates | G06F 9/44 |
| | | | | 717/124 |
| 2016/0378637 | A1 | 12/2016 | Gamble et al. | |
| 2017/0161171 | A1 | 6/2017 | Batzdorff et al. | |
| 2017/0315901 | A1* | 11/2017 | Wang | G06F 11/362 |
| 2020/0250073 | A1 | 8/2020 | Tucker et al. | |

OTHER PUBLICATIONS

"Debugging over the V8 Inspector Protocol," https://v8.dev/docs/inspector, printed Oct. 22, 2021, 3 pages.

IBM Cloud Education, "Containerization Explained," https://www.ibm.com/cloud/learn/containerization, printed Oct. 25, 2021, 14 pages.

"Kubernetes," Wikipedia, https://en.wikipedia.org/wiki/Kubernetes, printed Oct. 22, 2021, 16 pages.

Kubernetes, "Pods," https://kubernetes.io/docs/concepts/workloads/pods/, printed Oct. 22, 2021, 6 pages.

Kubernetes Engine Documentation, "Pod, What is a Pod?," https://cloud.google.com/kubernetes-engine/docs/concepts/pod, printed Oct. 22, 2021, 7 pages.

Multitenant Deployment Architecture in Business Central, https://docs.microsoft.com/en-us/dynamics365/business-central/dev-itpro/deployment/multitenant-deployment-architecture, printed Oct. 25, 2021, 6 pages.

"Node.js," Wikipedia, https://en.wikipedia.org/wiki/Node.js, printed Oct. 22, 2021, 11 pages.

Lucas PenzeyMoog, "Understanding Socket Connections in Computer Networking," https://medium.com/swlh/understanding-socket-connections-in-computer-networking-bac304812b5c, printed Oct. 22, 2021, 5 pages.

"SAP Central Business Configuration, Overview," https://help.sap.com/sapcentralbusinessconfiguration/SAP_Central_Business_Configuration_Overview.pdf, printed Oct. 22, 2021, 13 pages.

"Understanding cloud-native applications," https://www.redhat.com/en/topics/cloud-native-apps, Jun. 20, 2018, 9 pages.

Ward, Chris, "Handling Environment Variables with Kubernetes," https://humanitec.com/blog/handling-environment-variables-with-kubernetes, Jun. 5, 2020, 14 pages.

* cited by examiner

SECURE DEBUGGING IN MULTITENANT CLOUD ENVIRONMENT

BACKGROUND

In a multitenant computing environment (also referred to as "multitenancy"), one instance of a software application and supporting infrastructure can serve multiple user groups, or tenants. Thus, multiple tenants can share the same application and other computing resources running on the same operating system, on the same hardware, with the same data-storage mechanism(s). Even though resources are shared, each tenant can appear to have its own instance of the application. For example, the underlying data of the tenants can be kept separate and secure. Compared to a single-tenancy computing environment (in which one instance of a software application and supporting infrastructure serves only one tenant), multitenancy can be cheaper, have more efficient resource usage, lead to a lower maintenance cost and have a potentially larger computing capacity. However, multitenancy also brings a number of technical challenges. Accordingly, room for improvement exists for multitenant management.

DETAILED DESCRIPTION

Figure 1:
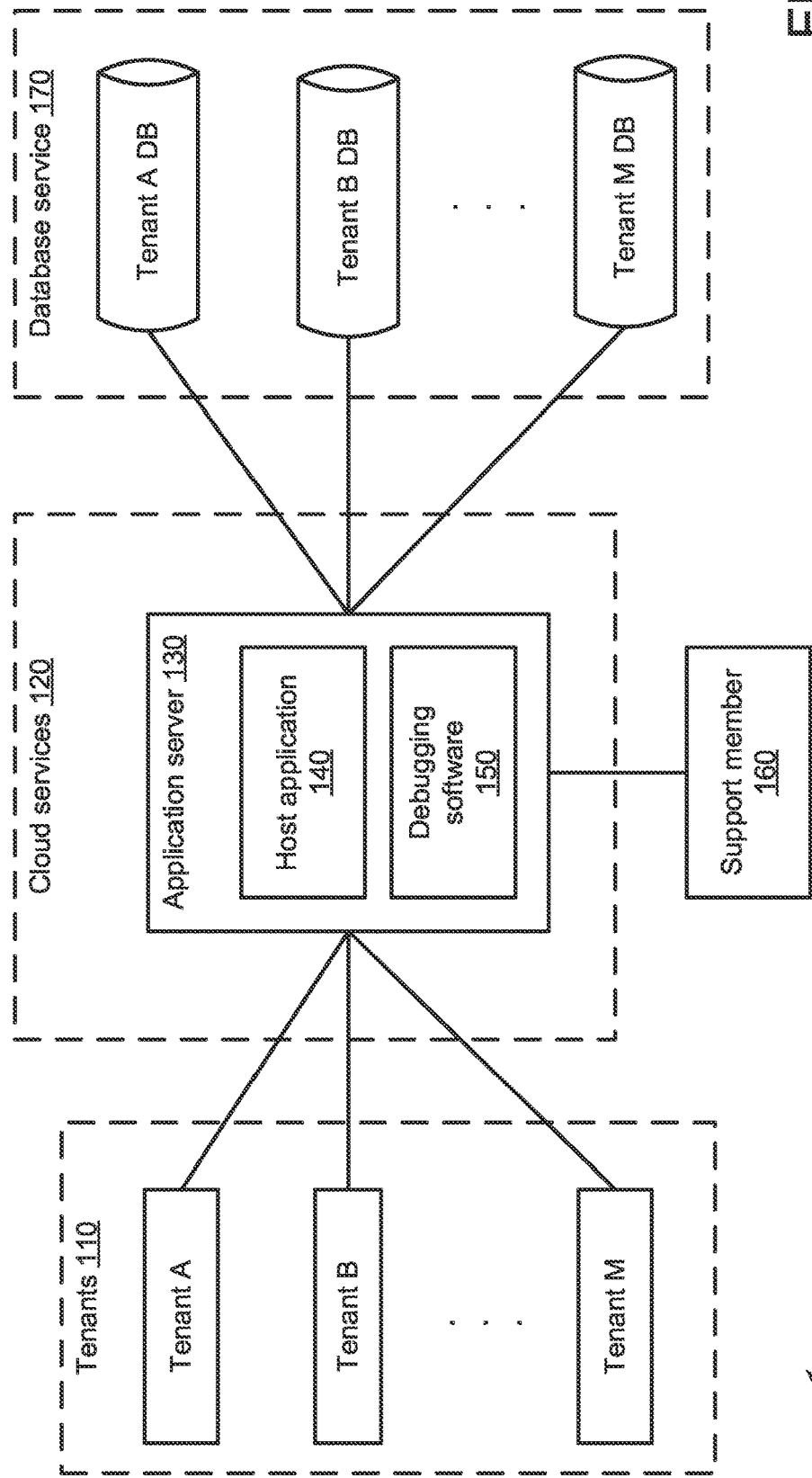
FIG. 1 is an overall block diagram of an example multitenant cloud computing system configured to support secure debugging from a server side.

Example 1—Overview of Debugging in Multitenant Computing System

In a multitenant computing system, a single software instance can serve multiple, distinct tenants or customers. Multitenancy is a feature in many types of cloud computing services, such as infrastructure-as-a-service (IaaS), platform-as-a-service (PaaS), software-as-a-service (SaaS), containers, and serverless computing. For example, a SaaS provider can run a single instance of an application and offer access to individual tenants. Each tenant's data can remain isolated, although it can access the same software as other tenants.

While multitenancy has many advantages compared to single-tenancy, such as reduced cost and improved efficiency and flexibility, it also has technical challenges. One particular challenge is related to debugging. If a tenant user has an issue with a delivered software application (i.e., the software in a production environment), the tenant user can report the issue to a support member (e.g., technical support), e.g., via a ticket. The support member can investigate the issue by analyzing the tenant user's observations noted in the ticket and/or inspecting corresponding log files generated when the tenant user ran the software application. However, in many circumstances, such investigation cannot fully diagnose the issue as the observations may not be accurate and/or complete, and the log files may only record limited information after the issue occurred and may not capture the runtime environment that led to the problem. In such cases, it would be desirable that the support member can debug the software application, from the server side (i.e., remotely), in the production environment within the context of the tenant user (e.g., replicating the actions taken by the tenant user, and using the same data used by the tenant user).

Although remote debugging is an effective way to identify the cause of the issue, it can also bring tenant management, data security, and regulatory compliance challenges in the multitenant cloud environment. For example, debugging the application associated with one tenant user in real-time, if not properly managed, may affect the execution of the software application by other tenant users. In another example, if not properly handled, debugging the software application associated with one tenant user may change the production environment of the software application and/or alter data of the tenant user. In yet a further example, certain part of the source code and/or the tenant user's data may be confidential. If not properly handled, such confidential information may be exposed to the support member during the debugging.

Thus, it would be advantageous for an improved system and method that support remote debugging a tenant user's issues encountered when running a shared software application in a multitenant cloud environment in an efficient, secure, and compliant way. Such improved debugging technologies can be applied across a wide variety of enterprise software environments.

Example 2—Example Overview of Multitenant Cloud System Supporting Secure Debugging FIG. 1 shows an overall block diagram of an example multitenant cloud computing system 100 configured to support secure debugging from a server side.

As shown, in the multitenant cloud computing system 100, a plurality of tenants or tenant users 110 (e.g., tenants A, B, . . . M) can share cloud services 120, which can include an application server 130. Although not shown, the cloud services 120 can also include other components, resources, and/or services, such as scheduling services for scheduling execution of jobs, tenant authentication and/or role management, tenant placement management, tenant data security check, etc.

The application server 130 can host or maintain one or more software applications 140 (also referred to as "host applications") that can be shared by the plurality of tenant users 110. In other words, a dedicated instance of a host application 140 can be created for each tenant user 110 who runs or executes the host application 140.

The multitenant cloud computing system 100 also includes database services 170 connected to the application server 130. As shown, the database services 170 can include a plurality of tenant specific databases (e.g., tenant A's data can be stored in tenant A database, tenant B's data can be stored in tenant B database, etc.). Each tenant's database can be isolated and remain invisible to other tenants. By separating application from data, the same cloud solution can be deployed to many customers with centralized maintenance of the application and isolation of each tenant. Although not shown, the database services 170 can also include a shared application database. For example, the shared application database can contain tables that define host applications 140, such as object table and other system tables.

As shown, the application server 130 can include a debugging software 150 (also referred to as "debugging application" or simply "debugger") which can be shared by the tenant users 110. After receiving a request to debug an issue experienced by one specific tenant user, e.g., Tenant A, when executing the host application 140, a support member 160 can use the debugging software 150 to remotely debug the host application 140 associated with Tenant A and interacting with Tenant A database that is specific to Tenant A. For example, from the application server side, the support member 160 can log in as a dedicated tenant user granted certain access to the Tenant A database and run the host application 140. In other words, the support member 160 can only access data that Tenant A can access (e.g., the support member 160 cannot access Tenant B or other tenants' data). Thus, the support member 160 can provide across-tenant debugging support remotely while respecting data isolation between tenants.

As described more fully below, through the debugging software 150, the support member 160 can set breakpoints in source code of the host application 140 and evaluate variables and call stack when the host application 140 hits the breakpoints. As described herein, the debugging software 150 is configured to confine the scope of the debugging and prevent the support member 160 from changing the production environment of the tenant user 110. In addition, the debugging software 150 can maintain a detailed log for the debugging session, which can be used for auditing purposes. Thus, the support member 160 can simulate and/or reproduce the issues experienced by the tenant user 110 and diagnose the underlying causes in a run-time environment, while complying with the data and application security requirement of the multitenant cloud computing system 100.

In practice, the systems shown herein, such as system 100, can vary in complexity, with additional functionality, more complex components, and the like. For example, there can be additional functionality within the application server 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the tickets, breakpoints, debug log, and the like can be stored in one or more computer-readable storage media or computer-readable storage devices. The technologies described herein can be generic to the specifics of operating systems or hardware and can be applied in any variety of environments to take advantage of the described features.

Example 3—Example Features of Secure Debugging in Multitenant Cloud Environment

In any of the examples described herein, the debugging software (e.g., 150) can have a number of features that make it particularly useful for troubleshooting cloud native software applications. In some examples, the debugging software can be built on NodeJS framework and run on the Kubernetes environment. Business logic and transactions can be handled on the application server, where tenants can share the common application runtime but have specific database schemas representing individual tenant's customer data.

Particularly, the debugging software described herein is configured to troubleshoot a host application in the production environment in the context of tenant specific data, while complying with the data and application security requirement of the multitenant cloud computing system.

In certain aspects, the debugging software can be configured to authenticate a support member. In other words, when a ticket is submitted to debug a host application associated with a tenant user (i.e., the application runs in the tenant user's production environment and uses the database that is specific to the tenant user), only an authorized support member is allowed to deploy the debugging software to troubleshoot the host application associated with the tenant user.

In certain aspects, the debugging software can provide a debugging user interface through which the support member can inspect source code of the host application that is under debugging. Since the source code can include a plurality of files organized in a hierarchy of folders or directories, the debugging user interface can provide a browser so that the support member can browse through folders/directories and select files for inspection.

In certain circumstances, the scope of the debugging that can be restricted so that the support member can only be allowed to debug selected portions of the source code whereas other portions of the source code (e.g., containing sensitive information) are excluded from debugging by the support member.

In certain aspects, through the debugging user interface, the support member can set breakpoints in the selected portions of the source code where the debugging is allowed. The support member can run the host application associated with the tenant user and the host application can pause at the breakpoints.

In certain aspects, the debugging software is configured to prevent cross-tenant access of data. This is important because in multitenant cloud environment, tenant separation is schema based and application runtime is shared between tenants. To ensure data security, the support member can only access data of a specific tenant user (whose runtime application is under debugging), not data of other tenant users. In addition, since the breakpoints are at the application runtime level and do not by themselves differentiate between tenants, the debugging software is configured to only pause the host application executed by the specific tenant user while not affecting running of the host application by other tenant users.

In certain aspects, the debugging software is configured to prevent altering the production environment of the tenant user. The application runtime to which the support member is given access to may contain environment variables which could influence the way the tenant's system works and/or may contain sensitive information. Since such information is globally inside the application runtime, to ensure data and application security compliance, the debugging software is configured to prevent the support member from accessing such information from any breakpoint.

In certain aspects, the debugging software is configured to allow the support member to evaluate values of certain variables but prevent the support member from changing customer data associated with the tenant user or invoking a method call after the hosting application hits a breakpoint.

In certain aspects, the debugging software is configured to prevent the support member from changing configurations that affect authorization and/or authentication of users of the host application.

In certain aspects, the debugging software is configured to prevent the support member from stepping over an operation/statement or stepping into a method/function after the host application hits a breakpoint. Thus, the support member would not be able to access a portion of the source code that should be excluded from debugging by stepping execution of statements.

In certain aspects, for security compliance purposes, the debugging software is configured to provide an audit trail (e.g., maintaining a data log) on activities performed by the support member while accessing the tenant user's production environment during the debugging process.

In certain aspects, the debugging software is configured to provide a generic debugging user interface that can be integrated with any existing software debugging tools (e.g., the Chrome Debugging Protocol View, also known as V8 Inspector, etc.). For example, the debugging software can be configured to debug applications built on any programming language as long as it supports debugging and provides a debug adapter. The debugging software can interface with the debug adapter, through which to debug the application.

Implementation of the above data/application security and compliance features is described in more details below.

Figure 2:
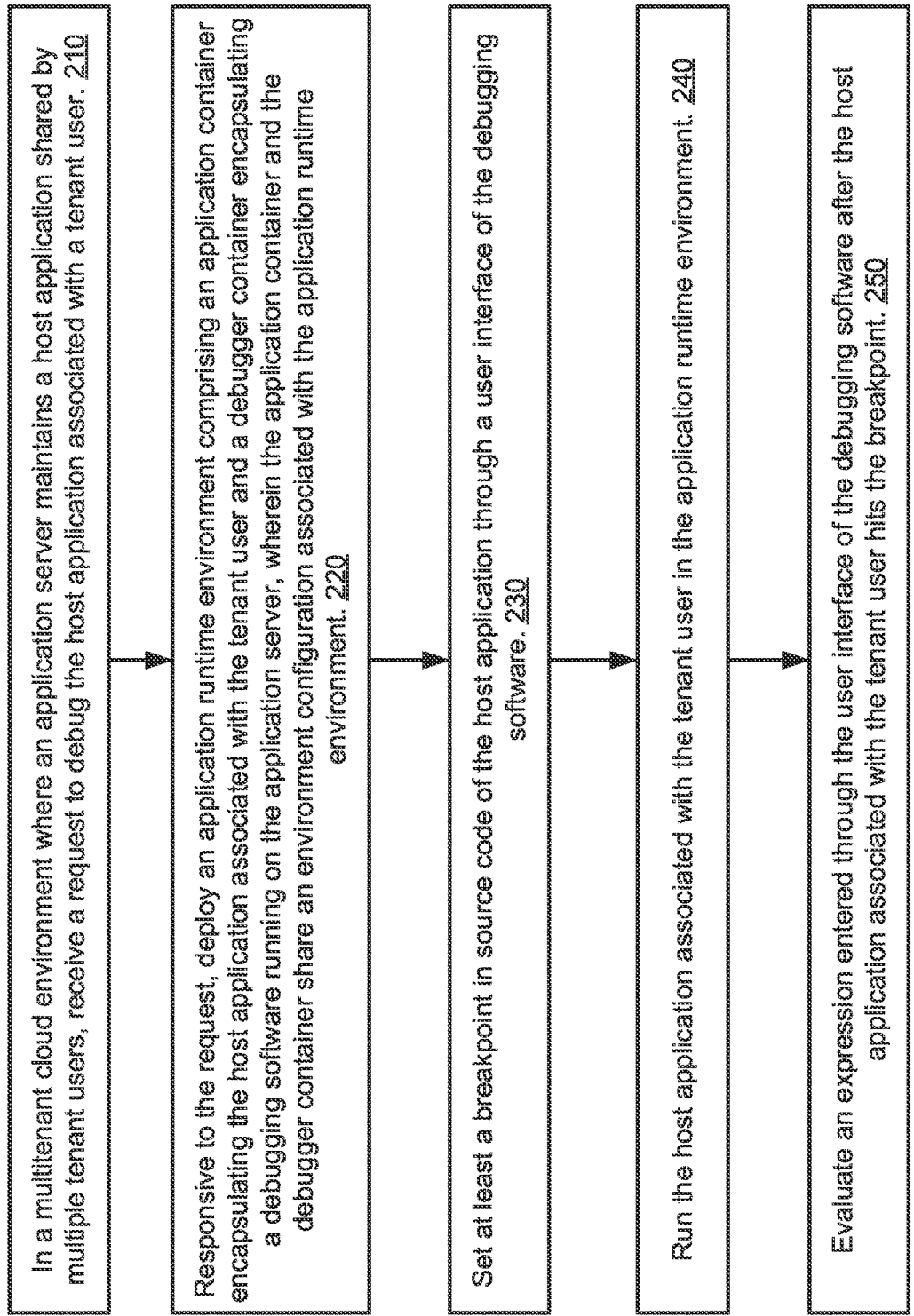
FIG. 2 is a flowchart illustrating an example overall method of implementing secure debugging in a multitenant cloud environment.

Example 4—Example Overall Method of Secure Debugging in Multitenant Cloud Environment FIG. 2 is a flowchart of an example overall method 200 of implementing secure debugging of host application associated with a tenant user in a multitenant cloud computing environment, and can be performed, for example, by the system of FIG. 1.

At 210, in a multitenant cloud environment where an application server maintains a host application shared by multiple tenant users, the method 200 can receive a request to debug the host application associated with a tenant user. The request can be in the form of a trouble ticket or simply a notification via email, phone call, or the like. In some circumstances, the request can be sent directly from the tenant user, e.g., in the form of a trouble ticket. In some circumstances, the request can be sent from an entity different from the tenant user. For example, a system administrator may identify a problem when the tenant user was running the host application. The system administrator (instead of the tenant user) may create a trouble ticket to request debugging of the host application associated with the tenant user.

At 220, responsive to the request, the method 200 can deploy an application runtime environment comprising an application container encapsulating the host application associated with the tenant user and a debugger container encapsulating a debugging software running on the application server. The application container and the debugger container can share an environment configuration associated with the application runtime environment. As described further below, access to the application runtime environment can be restricted to an authorized support member (e.g., 160), who is only allowed to use it to debug the host application associated with the tenant user. In other words, the application runtime environment can be both tenant user specific and support member specific.

In certain examples, the application runtime environment can be a Pod created and managed in the Kubernetes platform. Generally, a Pod is the basic execution unit of a Kubernetes application and represents processes running on a cluster. More specifically, a Pod is a collection of containers and its storage inside a node of a Kubernetes cluster. Containerization is the packaging of software code with just the operating system libraries and dependencies required to run the code to create a single lightweight executable—called a container—that runs consistently on any infrastructure. A Pod models an application-specific logical host and can contain different application containers which are relatively tightly coupled. For example, a Pod can include both the container with a Node.js application as well as a different container that feeds the data to be published by the Node.js webserver. The containers in a Pod share an IP Address and port space, are always co-located and co-scheduled, and run in a shared context on the same Kubernetes node.

In the examples described herein, the application runtime environment or Pod deployed in response to the debugging request includes both the application container and the debugger container such that the host application associated with the tenant user and the debugging software are tightly coupled.

In addition, the application container and the debugger container can share the environment configuration contained within or defined by the Pod. When a Pod is created, environment configuration for the Pod can be set which includes environment variables for the containers that run in the Pod, and Kubernetes can pass these environment variables to the applications encapsulated in the containers inside the Pod. In certain examples, the environment variables can be included in a configuration file associated with the Pod.

Returning to FIG. 2, at 230, the method 200 can set at least a breakpoint in source code of the host application through a user interface of the debugging software. As described further below, the ability to set breakpoints in source code by the support member can be restricted by a predefined scope, which can be specified in the environment configuration.

At 240, the method 200 can run the host application associated with the tenant user in the application runtime environment. For example, as described further below, the support member can attach the debugging software to the host application, and log in as a dedicated tenant user granted certain access to the database of the tenant user and run the host application within a debugging session that has a prescribed duration (i.e., the access granted to the support member has a predefined duration).

At 250, the method 200 can evaluate an expression entered through the user interface of the debugging software after the host application associated with the tenant user hits the breakpoint (e.g., execution stops at the breakpoint). In certain examples, the expressions can be regular expressions, which are text patterns used to match character combinations in strings (e.g., wildcard characters can be included in the regular expressions). As described further below, while expressions for evaluating certain variables can return values corresponding to those variables, certain expressions can yield no results or warnings to safeguard data and/or application security and for compliance reasons.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5—Example Debugging User Interface

Figure 3:
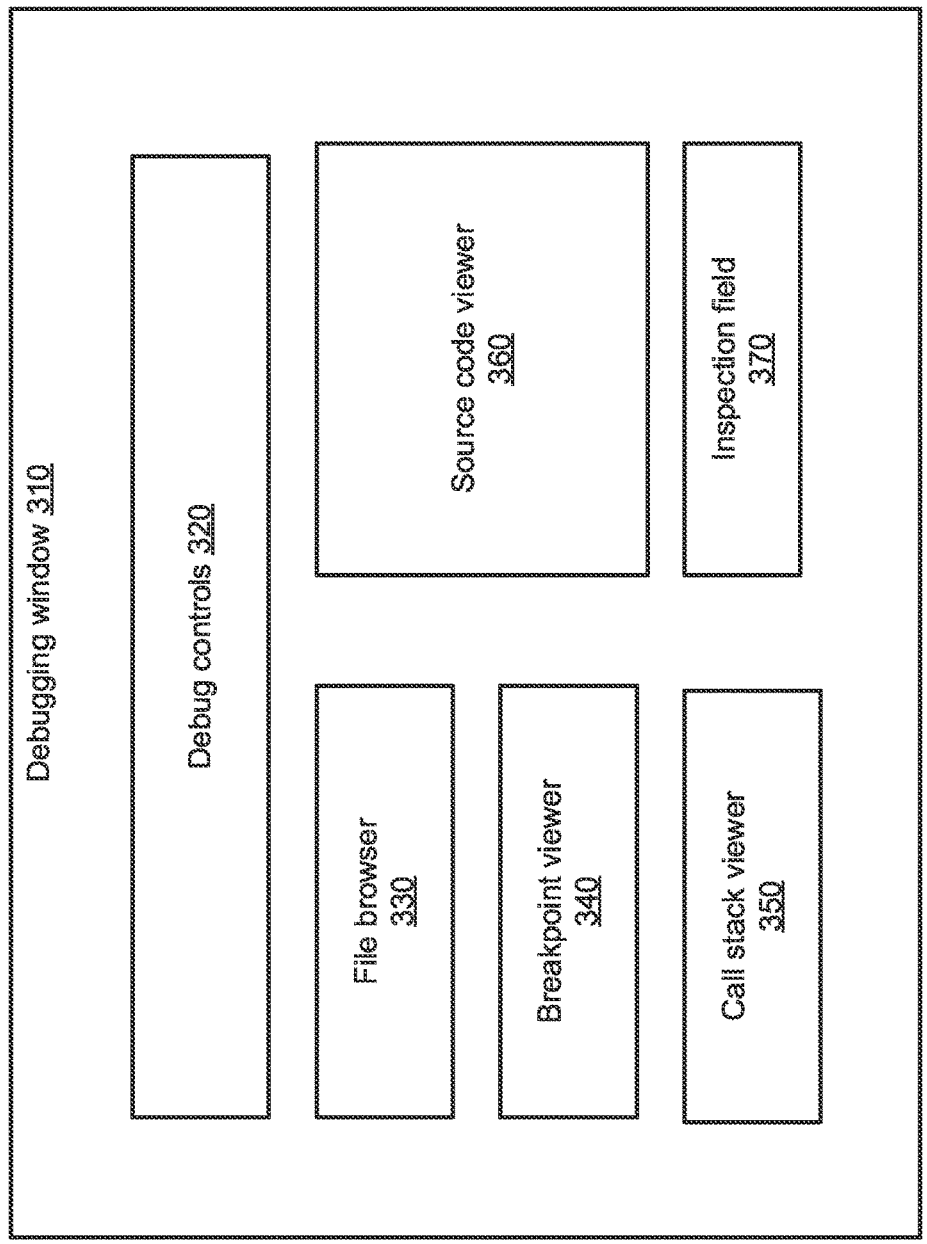
FIG. 3 is a diagram illustrating an example user interface of a debugging software that can be used for secure debugging in a multitenant cloud environment.

FIG. 3 depicts an example debugging user interface 300, which is a front end of a debugging software and can be accessed by a supporting member to securely debug a host application associated with a tenant user in a multitenant cloud environment. As described further below, the debugging user interface 300 can be linked to a backend of the debugging software which can further interface with a debug adaptor to debug the host application. Thus, any actions (e.g., setting or removing a breakpoint, evaluating an expression, etc.) taken on the debugging user interface 300 can be translated into corresponding actions taken by the debug adaptor. As described above, the debugging software can be encapsulated in a debugger container, which is further contained inside an application runtime environment (e.g., a Pod), along with an application container encapsulating the host application.

The debugging software can open a debugging window 310 which includes a plurality of fields, such as debug controls 320, file browser 330, breakpoint viewer 340, call stack viewer 350, source code viewer 360, and inspection field 370.

In certain examples, the debug controls 320 can include a plurality of controls (e.g., in the form of control icons, text menu, or the like) that can be selected by the support member. For example, the support member can toggle one of the controls to attach/detach the debugging software to/from the host application to be debugged. Attaching the debugging software to the host application starts a debugging session, whereas detaching the debugging software from the host application ends the debugging session. In another example, the support member can select one of the controls to resume (i.e., continue) execution of the host application after hitting a breakpoint. In an example embodiment, step debugging (e.g., step over, step into, step out) control is excluded from or disabled in the debug controls 320. In other words, even if the debug adapter (with which the debugging software interfaces) supports step debugging, such feature can be disabled in the debugging user interface 300 so that the support member would not be able to step into a portion of the source code that is restricted from debugging.

In certain examples, the file browser 330 is configured to present a list of files including source code of the host application that is under debugging. The list of files can be presented in a folder structure so that the support member can navigate through and identify a file of interest to view the source code contained therein. In certain examples, some of the source code files of the host application may not be shown in the file browser 330. This may be the case that such files contain confidential and/or sensitive information that should be hidden from the support member. Whether a source code file is shown in or hidden from the file browser 330 can be specified in the environment configuration (e.g., by setting one or more environment variables) when creating the application runtime environment.

In certain examples, the breakpoint viewer 340 is configured to present a list of breakpoints the support member has set when debugging the host application. In certain cases, the support member can delete a breakpoint from the breakpoint viewer 340 (e.g., by selecting the breakpoint and then click a delete key via keyboard or mouse).

In certain examples, the call stack viewer 350 is configured to show the current call stack of the host application when it hits a breakpoint set by the support member. The call stack lists the function or method calls that brought the host application to the breakpoint and the arguments passed to each function or method call. For example, the call stack viewer 350 can list the last function called before hitting the breakpoint, followed by each previously called function. In other words, the call stack viewer 350 can show the order in which methods and functions are called and can facilitate the support member to examine and understand the execution flow of an application.

In certain examples, the source code viewer 360 is configured to display the source code of host application. In certain cases, the displayed source code can correspond to (and/or be limited to) the source code file selected in the file browser 330. The source code viewer 360 can include vertical and/or horizontal scrolling bars through which the support member can browse through and inspect the source code. The support member can set or remove a breakpoint in a line of displayed source code, e.g., by double clicking the line of the code to toggle between setting and removing the breakpoint. When the running host application hits the breakpoint, the line of code corresponding to the breakpoint can be highlighted moved to a focus position (e.g., top or center) of the source code viewer 360.

In certain examples, a portion of the source code may be restricted from debugging for data/application security purposes, even if the source code can be viewed in the source code viewer 360. In such cases, the support member is prohibited from setting breakpoint in the restricted portion of the source code (e.g., doubling clicking a line of code will not create a breakpoint). The restricted portion of the source code can be indicated by certain visual cues, e.g., being greyed out in the source code viewer 360. If a source code file is excluded from debugging, the filename of that source code file can also be greyed out in the file browser 330. Whether a portion of the source code (or a source code file) is included or excluded from debugging can be specified in the environment configuration (e.g., by setting one or more environment variables) when creating the application runtime environment.

In certain cases, line numbers can be shown next to each line of source code. In certain cases, when the source code uses brackets or other keywords to define blocks of code, fold and/or unfold marks (e.g., [−], [+], or the like) can be added next to brackets or keywords, which the support member can click to collapse or expand the corresponding blocks of code.

In certain examples, the inspection field 370 can include a text box through which the support member can enter an expression in the forms of a text string or regular expression. For example, the debugging software can have a string match operation configured to compare the text string with a plurality of predefined text patterns to determine what variables or statements the support member wants to evaluate. In certain examples, an autocomplete feature can be implemented so that a suggested expression can be prompted as the support member enters a text string into the text box. By hitting a return key and/or clicking a button associated with the inspection field 370, the debugging software can return value(s) correspond to the entered expression or return a warning that the entered expression is invalid. For example, the debugging software can be configured to allow the support member to evaluate certain variables (e.g., global variables, stack variables, local variables, etc.) in the source code after the host application hits a breakpoint, and return runtime values corresponding to those variables in the inspection field 370. In another example, the debugging software can be configured to prohibit the support member from assigning or changing a value corresponding to a variable (which would alter the tenant user's data and/or the production environment). In yet another example, the debugging software can be configured to prohibit the support member from evaluating an expression which would otherwise cause the host application to execute a method or function.

Although FIG. 3 shows a particular arrangement of the fields in the debugging window 310, it should be understood that the relative position and/or size of the fields can be varied, and the same principles described herein apply. In addition, in certain circumstances, more or less fields can be included in the debugging window 310. For example, in certain cases, the breakpoint viewer can be integrated with the source code viewer. In certain cases, additional fields (e.g., a search bar allowing the support member to search a file or a string in the source code, etc.) can be added to the debugging window 310 as needed.

Figure 4:
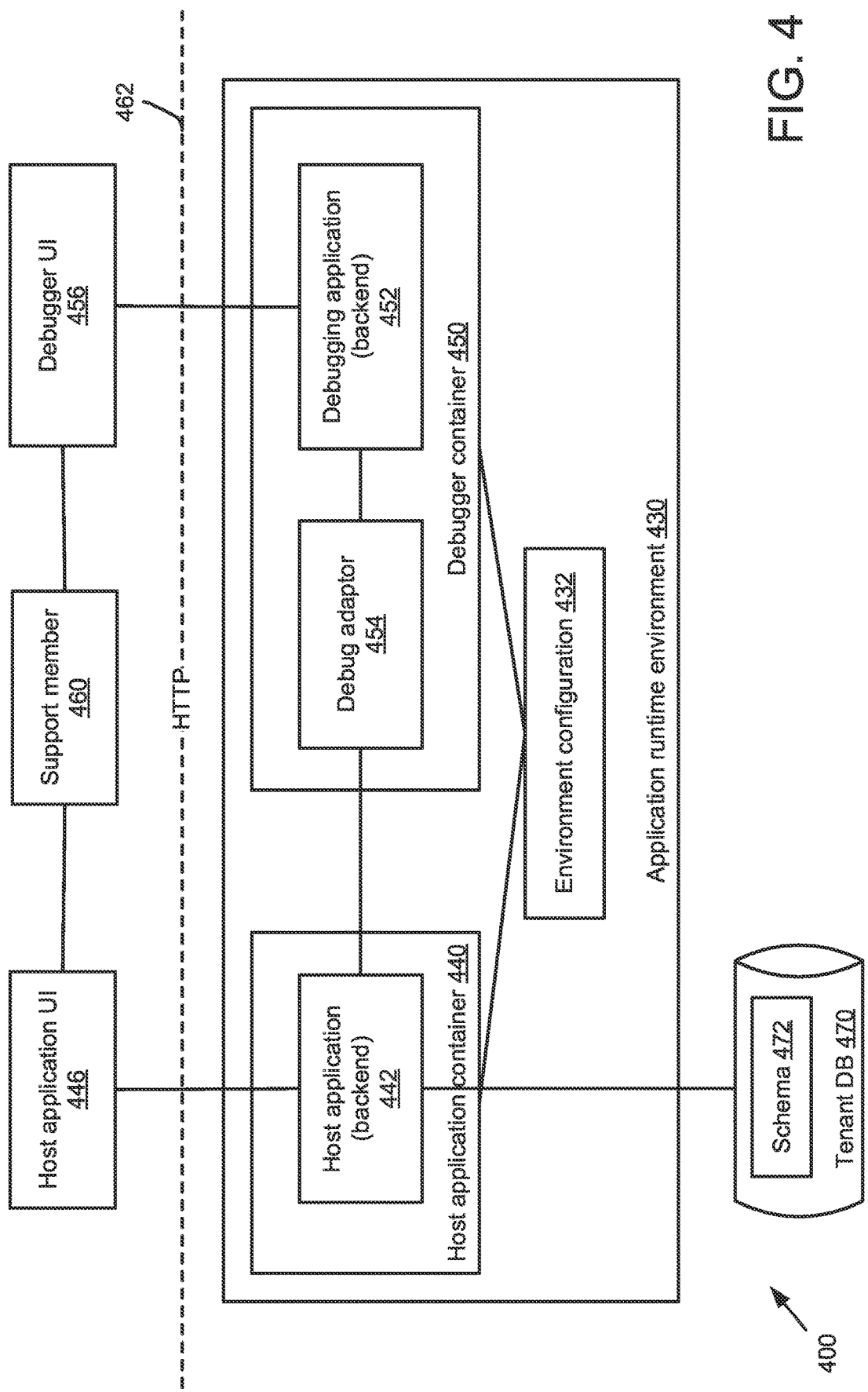
FIG. 4 is an example block diagram illustrating an overall framework that can be used to securely debug a host application run by a tenant in a multitenant cloud environment.

Example 6—Example Framework for Secure Debugging in Multitenant Cloud Environment FIG. 4 depicts a block diagram illustrating an overall framework 400 that can be used to securely debug a host application associated with a specific tenant user in a multitenant cloud environment.

As described above, after receiving a request to debug a host application associated with a specific tenant user, an application runtime environment 430 can be deployed at the application server (e.g., 130), which includes a host application container 440 and a debugger container 450.

As shown, the host application container 440 can encapsulate the host application 442 running on the application server (i.e., the backend). The debugger container 450 can encapsulate a debugging application 452 residing in the application server (i.e., the backend). After authenticated, the support member 460 can launch a debugger UI 456 (i.e., the front end of the debugging application 452) similar to 300. The support member 460 can also log in as a dedicated tenant user granted certain access to the database 470 of the tenant user within a debugging session having a prescribed duration through a host application UI 446 (i.e., the front end of the host application 442) and run the host application 442. As shown, an HTTP layer 462 can serve as an application data transfer protocol connecting the front ends to the back ends for both host application 442 and debugging application 452. As noted above, the tenant user can have a tenant specific database which is separated from databases of other tenants. An example tenant specific database 470 containing a tenant specific database schema 472 is shown in FIG. 4, which the tenant user can access through the host application 442.

In the depicted example, the debugger container 450 can further encapsulate a debug adaptor 454, such as the open source V8 Inspector, which provides a library of debugging functions. The debug adaptor 454 can serve as an intermediary and link between the host application 442 and the debugging application 452. Thus, the debugging application 452 can debug the host application 442 by calling the debugging functions of the debug adaptor 454. Separation of the debugging application 452 and the debug adaptor 454 allows flexibility of using different debug adaptors for different types of host applications. In other examples, the debug adaptor 454 can be fully integrated within the debugging application 452. Note that the debug adaptor 454 can support more debugging functions than what the debugger UI 456 offers to the support member 460. For example, while the debug adaptor 454 may support stepping execution of statement (e.g., step over, step into, etc.) and/or assigning a value to a variable, such functions may be disabled (e.g., hidden or greyed out) by the debugger UI 456.

Thus, the overall framework 400 depicted herein can be a generic implementation of a debugger. In other words, the debugging application 452 can have a generic debugger UI 456 that is suitable for debugging different types of host applications 442. For example, it can be used to debug applications built on any programming language as long as it supports debugging and provides a corresponding debug adaptor 454. The debugging application 452 can plug into that debug adaptor 454 and enable debugging.

As shown, the application runtime environment 430 can also include an environment configuration 432, which can be shared by both the host application container 440 and the debugger container 450. The environment configuration 432 can contain a plurality of environment variables which can be predefined when creating the application runtime environment 430. For example, some of the environment variables can define a scope of the debugging (e.g., specifying which source code files are visible or invisible to the support member 460, specifying in which portion of the source code the support member 460 can set breakpoints and which portion of the source code is prohibited from debugging, etc.).

In certain examples, the application runtime environment 430 can be a Pod created and managed in the Kubernetes platform. Thus, the application runtime environment 430 can be a self-contained, isolated logical host that contains the systemic needs of the applications (e.g., the host application 442 and the debugging application 452) it serves, and can be used to run a single instance of the encapsulated applications on the cluster. As a Pod, the application runtime environment 430 can also be ephemeral. In other words, the application runtime environment 430 can be deleted by a user (e.g., the support member) or by a Kubernetes controller, e.g., after a predefined duration elapses since deploying the application runtime environment 430.

Although the technology disclosed herein is described in the context of multitenant cloud environment, it is to be understood that the debugging framework 400 can also be used in a single-tenant environment and/or to debug a software application in the development environment (i.e., the software is still under development before releasing to customers). For example, certain restrictions can be relaxed in the debugging application 452 and/or the debugger UI 456, thus allowing or enabling additional debugging capabilities (step execution, changing variables, etc.).

Example 7—Example Authentication of Support Member

Still referring to FIG. 4, after the application runtime environment 430 is established, the support member 460 can launch the debugger UI 456. In certain examples, the support member 460 must be successfully authenticated before he or she can access the debugger UI 456. In other words, the support member 460 must be authorized to debug the host application 442 associated with the specific tenant user. In certain examples, the application runtime environment 430 can be dedicated to an authorized support member 460. For example, the environment configuration 432 can contain credential information on the authorized support member 460 who can debug the application associated with the tenant user and access the tenant user's data. In certain examples, the debugging application 452 can implement the support member authentication via a single sign-on scheme.

Example 8—Example Inspection of Source Code

After successfully launching the debugger UI 456, the support member 460 can select a source code file which he or she wants to investigate. This can be achieved, e.g., by navigating in a file browser (e.g., 330) of the debugger UI 456. The source code of the selected source code file can be displayed in a source code viewer (e.g., 360) of the debugger UI 456. As described above, the environment configuration 432 can contain information on what files are shown in the file browser and/or what portion of the source code is accessible to the support member 460, and such information can be retrieved by the debugging application 452 and communicated to the debugger UI 456.

Example 9—Example Placement of Breakpoints

By inspecting the source code, the support member 460 can identify statements of interests for further evaluation, e.g., by placing one or more breakpoints. As described above, the scope of the debugging can be restricted so as to prevent placing breakpoints in certain portions of the source code. In certain examples, the scope of the debugging can be defined in a meta file which is created by the provider of the host application 442. Such meta file and/or storage path of the meta file, can be included in the environment configuration 432, which can be accessed by the debugging application 452 and conveyed to the debugger UI 456. Thus, whenever the support member 460 attempts to set a breakpoint via the debugger UI 456, the debugging application 452 can check the meta file to see if such breakpoint is within the allowed scope of the debugging. If allowed, the breakpoint can be presented next to the line of code in the debugger UI 456. Otherwise, a feedback can be provided to the support member 460, notifying the attempt to set the breakpoint is denied.

Example 10—Example Handling of Breakpoints When Executing Host Application

Because the debugging application 452 interfaces with the debug adaptor 454, which in turn interfaces with the host application 442, the breakpoints set in the debugger UI 456 by the support member 460 can be placed in the host application 442. Because in the multitenant cloud environment, tenant separation is schema based and the application runtime is shared between tenants, breakpoints placed in the host application 442 are at the application runtime level and by themselves do not differentiate between tenants. However, as described further below, mechanism is implemented so that the breakpoints placed in the host application 442 is specific to the tenant user who is under debugging and do not affect execution of the host application 442 run by other tenant users.

Through the host application UI 446, the support member 460 can login as a dedicated tenant user granted certain access to the database 470 of the tenant user and run the host application 442 within a debugging session that has a prescribed duration. The support member 460 can perform steps to simulate or replicate the issues previously experienced by the tenant user. By logging in as the tenant user, the support member 460 can access the database schema 472 and/or other data contained in the tenant database 470 that is specific to the tenant user.

Based on the steps performed, once the execution of the host application 442 has reached the code where a breakpoint is placed, a notification can be sent to the debug adapter 454, which in turn can notify the debugging application 452.

In certain examples, the execution of the host application 442 can be provisionally paused at the breakpoint. After receiving the notification that the breakpoint is hit, the debugging application 452 can check whether the execution of the host application 442 should indeed be paused or not at the breakpoint.

If the host application 442 is executed by the tenant user who is under debugging, the provisional pause will be sustained and the hit breakpoint can be highlighted in the debugger UI 456, i.e., the execution will indeed be paused at the breakpoint. On the other hand, if the host application 442 is executed by other tenants, the provisional pause will be removed, i.e., the host application 442 can resume execution as if the breakpoint does not exist. As a result, the breakpoint set by the support member will only effectively pause for the host application associated with the specific tenant user, and do not affect application executed by other tenant users.

In certain examples, the debugging application 452 can determine whether the host application 442 should indeed be paused or not at the breakpoint by cross checking the environment configuration 432. As noted above, the application runtime environment 430 is created to only allow the authorized support member 460 to debug the host application associated with the specific tenant user (i.e., cross-tenant access of data is prohibited). This can be achieved, e.g., by specifying information of the specific tenant user (for whom the debugging is performed) and the support member (who is authorized to debug for the tenant user) in the environment configuration 432. In addition, the debugging application 452 is aware of who is running the host application and who is running the debugging. Thus, the debugging application 452 can check (1) if the person who is running the debugging matches the authorized support member, and (2) if the current host application session is associated with the specific tenant user. If both checks return yes, the debugging application 452 can sustain the provisional pause and the hit breakpoint can be highlighted in the debugger UI 456. Otherwise (i.e., either the tenant user or the support member does not match), the provisional pause can be disabled and the host application 442 can resume execution. Because the above check can be performed instantaneously (e.g., the duration between provisional pause and resuming execution can be negligible), an observer would not be able to perceive any pause of the execution of the host application at the breakpoint if the host application 442 is executed by other tenants.

Example 11—Example Restriction of Step Execution

When the host application 442 associated with the tenant user hits a breakpoint and pauses, allowing the support member 460 to execute the host application 442 step by step could potentially lead to parts of the source code which is restricted from debugging. As described above, in certain examples, the debugging application 452 and the debugger UI 456 can be configured to prohibit stepping execution, even if the debug adaptor 454 may support such functions. Thus, after pausing at a breakpoint, the support member 460 can resume execution of the host application 442, but cannot execute the statement step-by-step. To pause at the next line of source code, the support member 460 can set another breakpoint at the line, if the breakpoint is allowed to be placed there.

Example 12—Example Evaluation of Expressions

After the host application 442 associated with the tenant user hits a breakpoint, the support member 460 can enter an expression (e.g., regular expression) in an inspection field (e.g., 370) of the debugger UI 456. As described herein, the entered expression can be compared with predefined text patterns so that only expressions that do not alter the production environment, or alter the tenant user data, or alter the support member's credentials can be evaluated.

For example, if the entered expression matches a global or local variable name appeared in the source code, the runtime values corresponding to that variable can be returned in the inspection field. On the other hand, if the entered expression is an assignment statement or a method/function call, a warning of invalid expression can be presented in the inspection field. In other words, the expression entered by the support member 460 can only read from (but not write to) tenant user data. As noted above, such restriction is applied to prevent the support member 460 from altering data and/or production environment of the tenant user. In addition, such restriction can prevent the support member 460 from evaluating an expression which could otherwise elevate the authorization of the support user 460 or impersonate his or her identity with someone else's.

Example 13—Example Generation of Debug Logs

In certain examples, the debugging application 452 can be configured to maintain a detailed debug log for each debugging session. The debug log can record any activities performed by the support member while debugging the host application associated with the tenant user via the application runtime environment 430. For example, the debug log can log each interaction between the support member 460 and the application runtime environment 430, such as the timestamps when the support member 460 attaches/detaches the debugging application 452 to/from the host application 442, the timestamps when the support member 460 logs in and/or logs off the host application 442 as the tenant user, the breakpoints placed by the support member 460 and the timestamps of placing the breakpoints, the expressions entered by the support member 460 and timestamps of entering the expressions, etc. Such debug log can provide a detailed audit trail which can be reviewed and/or analyzed to fulfill compliance. For example, responsive to a request to audit debugging activity of the support member 460, the information logged in the from the log file (e.g., breakpoints, expressions, timestamps, etc.) can be provided.

Example 14—Example Process of Secure Debugging in Multitenant Cloud Environment

Figure 5:
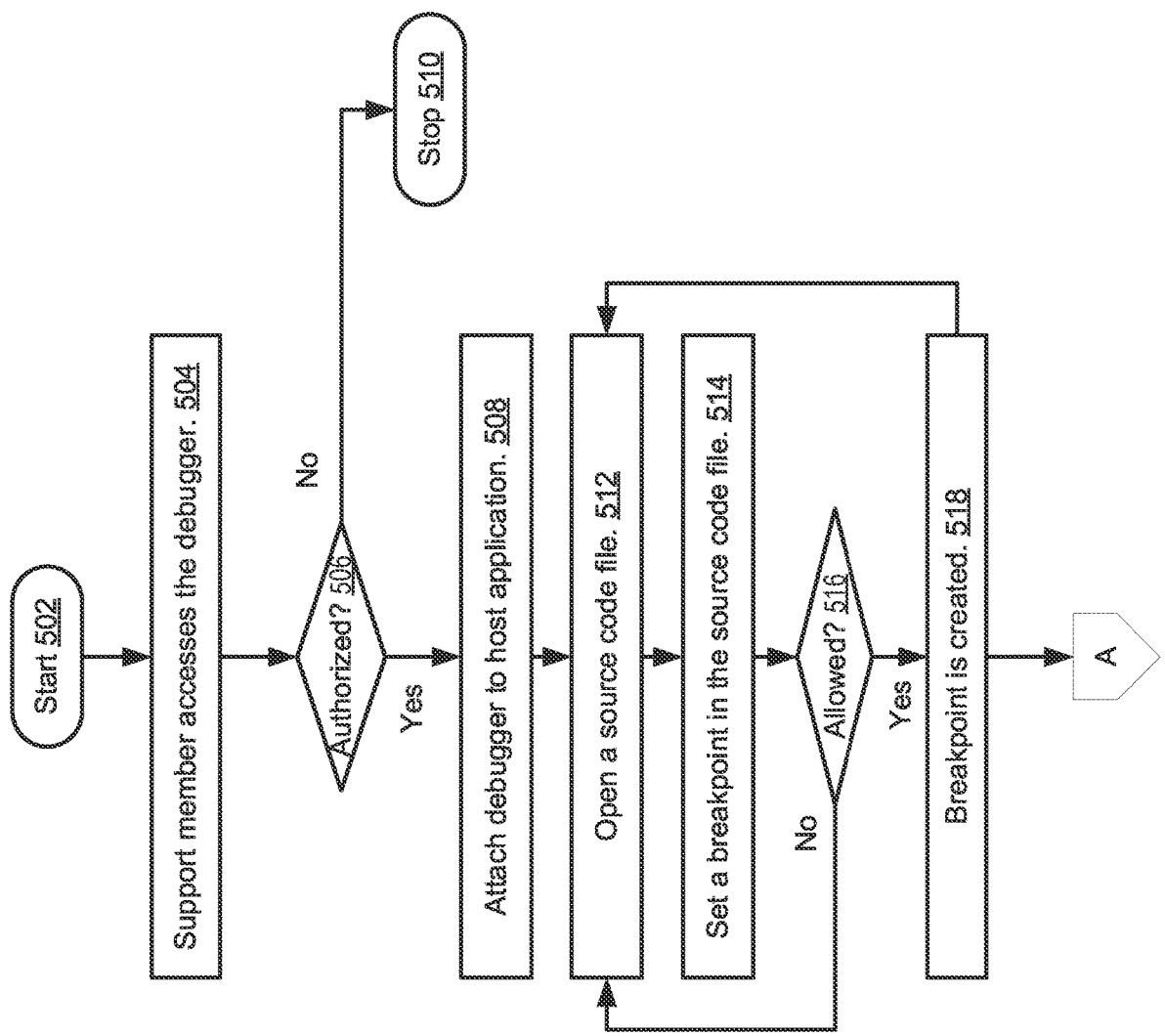
FIG. 5 is a flow diagram illustrating an example process a support user can take to securely debug a host application run by a tenant in a multitenant cloud environment.
Figure 6:
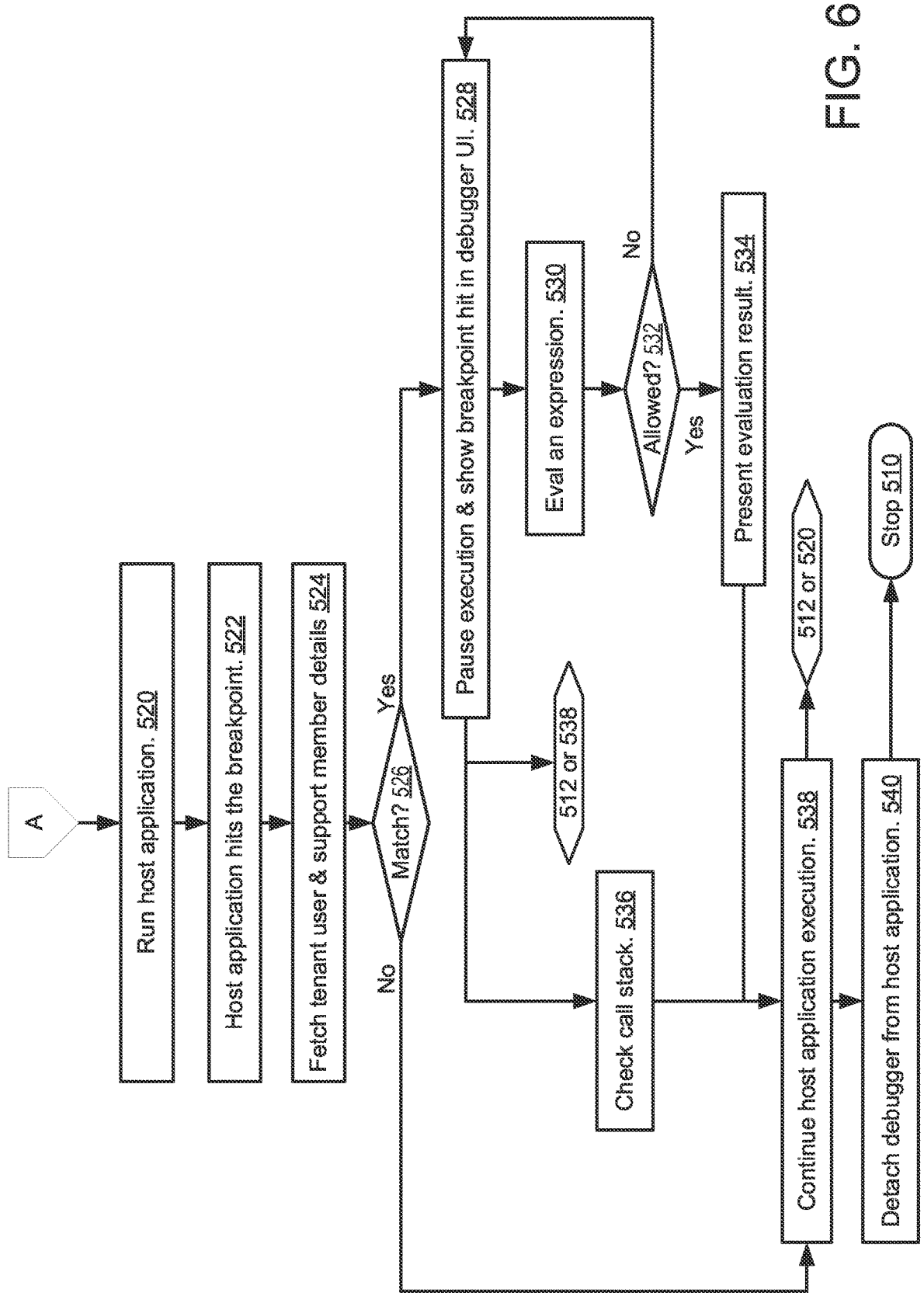
FIG. 6 is a continuation of the example process depicted in FIG. 5.

FIGS. 5-6 depict an example process flow a support member can take to securely debug a host application associated with a tenant user in a multitenant cloud environment. Although specific steps are shown in FIGS. 5-6, it should be understood that the depicted steps are merely exemplary and a support member may take different steps during a debugging session.

At the start 502 of the process, a request to debug the host application associated with a tenant user is received, and responsive to the request, an application runtime environment (e.g., 430) comprising a debugging software (e.g., 452 and 456) can be deployed. As noted above, the application runtime environment can be specific to an authorized support member and the specific tenant user.

At 504, a support member attempts to access the debugging software. At 506, an authentication step can be performed (e.g., via a single sign-on) to check if the support member is authorized to use the debugging software. If the authentication fails, the debugging session ends at 510 (and the failed attempt by the support member can be automatically recorded in the log file). Otherwise (i.e., the support member is authenticated), at 508, the support member can attach the debugging software to the host application associated with the tenant user (and such attachment can also be automatically recorded in the log file).

At 512, the support member can open a source code file (e.g., by selecting a file in the file browser 330) for inspection (e.g., in the source code viewer 360). In certain cases, which files are opened for inspection can be recorded in the log file.

At 514, the support member can attempt to set a breakpoint in the source code file. A check can be performed at 516 to determine if the breakpoint is allowed to be placed therein. If not (e.g., the breakpoint is outside the scope of debugging), the breakpoint will not be created and the support member can be prompted to open another source file to set breakpoint(s). If yes, the breakpoint can be successfully created at 518. In certain cases, any breakpoints successfully placed by the support member can be recorded in the log file. In certain cases, attempts to set the breakpoints, if even the attempts failed, can also be recorded in the log file.

At 520, the support member can run the host application. At 522, the host application hits the breakpoint placed by the support member. In certain cases, running of the host application by the support member can be recorded in the log file.

At 524, the debugging software can fetch the tenant user and support member details. Then the debugging software can perform a check at 526, determining if the person who is running the debugging matches the authorized support member and the current host application session is associated with the specific tenant user.

If either match returns no, the host application will continue at 538. If both matches return yes, the host application pauses at the breakpoint and highlights the hit breakpoint in the debugger UI at 528.

Then, the support member can have several options. For example, the support member can check the call stack at 536 (e.g., in the call stack viewer 350). In another example, the support member can evaluate an expression at 530 (e.g., by entering the expression in the inspection field 370). Alternatively, the support member can choose to open another file to inspect source code (e.g., 512), and/or resume execution of the host application (e.g., go to step 538).

At 532, a validity check can be performed to determine if the expression entered by the support member is allowed. If yes, the evaluation results can be returned at 534. Otherwise, a warning can be prompted to the support member, who can then determine what next step to take at the breakpoint. In certain cases, any expressions entered/evaluated by the support member can be recorded in the log file.

After evaluating the call stack and/or evaluating the expression, the support member can choose to resume the execution of the host application at 538. The support member can have the option to open another file to inspect source code (e.g., 512) and/or continue to run the host application (e.g., at 520).

After finishing debugging, the support member can detach the debugging software from the host application at 540 and ends the debugging session at 510. Such detachment can be automatically recorded in the log file.

Example 15—Example Advantages

A number of advantages can be achieved via the technology described herein. For example, the described technology allows an authorized support member to remotely troubleshoot issues experienced by one specific tenant user running a software application hosted in an application server and shared by many tenant users. By deploying an application runtime environment that is dedicated to the authorized support member and the specific tenant user, such remote debugging can be performed in a secure and compliant manner Specifically, the application runtime environment can define the scope of debugging within which the support member can set breakpoints and evaluate variables in runtime. The breakpoints placed by the support member are specific to the specific tenant user, thus not affecting execution of the host application by other tenant users. Further, a detailed debug log is generated when performing the debug session, thus providing a detailed audit trail which can be reviewed and/or analyzed to fulfill compliance. Such features represent significant improvement in efficiency and security of troubleshooting software applications in the multitenant cloud environment.

Example 16—Example Computing Systems

Figure 7:
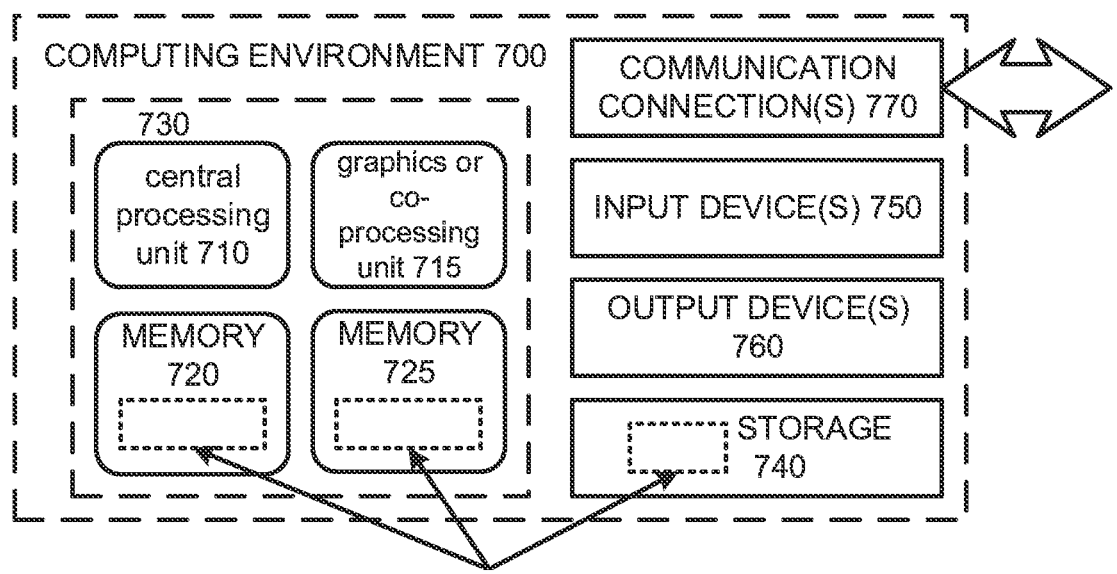
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 can store software 780 implementing one or more innovations described herein, in the form of computer-executable instructions suitable for execution by the processing unit(s) 710, 715.

A computing system 700 can have additional features. For example, the computing system 700 can include storage 740, one or more input devices 750, one or more output devices 760, and one or more communication connections 770, including input devices, output devices, and communication connections for interacting with a user. An interconnection mechanism (not shown) such as a bus, controller, or network can interconnect the components of the computing system 700. Typically, operating system software (not shown) can provide an operating environment for other software executing in the computing system 700, and coordinate activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 can store instructions for the software 280 implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 17—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 18—Example Cloud Computing Environment

Figure 8:
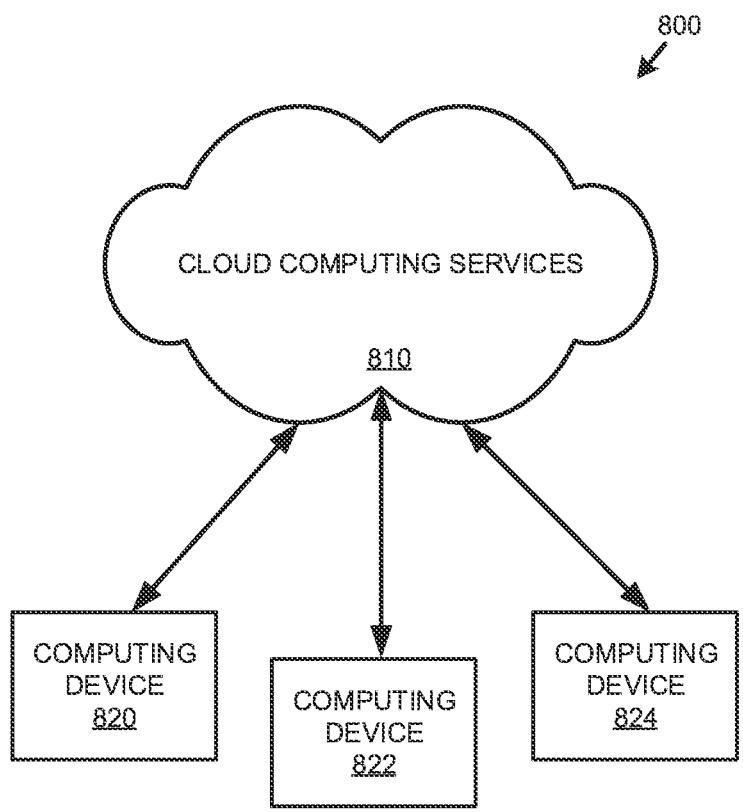
FIG. 8 is a block diagram of an example cloud computing environment that can be used in conjunction with the technologies described herein.

FIG. 8 depicts an example cloud computing environment 800 in which the described technologies can be implemented, including, e.g., the system 100 and other systems herein. The cloud computing environment 800 can include cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 can be utilized by various types of computing devices (e.g., client computing devices), such as computing devices 820, 822, and 823. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 19—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 20—Example Embodiments

Any of the following embodiments can be implemented.

Example 1. A computer-implemented method comprising: in a multitenant cloud environment where an application server maintains a host application shared by multiple tenant users, receiving a request to debug the host application associated with a tenant user; responsive to the request, deploying an application runtime environment comprising an application container encapsulating the host application associated with the tenant user and a debugger container encapsulating a debugging software running on the application server, wherein the application container and the debugger container share an environment configuration associated with the application runtime environment; setting at least a breakpoint in source code of the host application through a user interface of the debugging software; running the host application associated with the tenant user in the application runtime environment; and evaluating an expression entered through the user interface of the debugging software after the host application associated with the tenant user hits the breakpoint.

Example 2. The method of example 1, wherein the environment configuration comprises scope variables which define in which parts of the source code of the host application the breakpoint is allowed to be set.

Example 3. The method of any one of examples 1-2, wherein evaluating the expression comprises evaluating a variable defined in the source code and returning a value of the variable when the host application hits the breakpoint.

Example 4. The method of any one of examples 1-3, wherein evaluating the expression comprises prohibiting changing data of the tenant user.

Example 5. The method of any one of examples 1-4, further comprising authenticating a support member who has access to the application runtime environment, wherein authenticating comprises evaluating a credential of the support member based on the request from the tenant user.

Example 6. The method of example 5, wherein evaluating the expression comprises prohibiting changing access privilege of the support member.

Example 7. The method of any one of examples 1-6, further comprising restricting the breakpoint to the tenant user such that the host application run by other tenant users does not stop at the breakpoint.

Example 8. The method of any one of examples 1-7, further comprising presenting a call stack of the running host application in the user interface of the debugging software after the host application hits the breakpoint.

Example 9. The method of any one of examples 1-8, further comprising deleting the application runtime environment when a predefined duration elapses since deploying the application runtime environment.

Example 10. The method of any one of examples 1, further comprising logging the expression in a log file; and responsive to a request to audit debugging activity of a support member, providing the expression from the log file.

Example 11. A computing system, comprising: an application server maintaining a host application shared by multiple tenant users, wherein the application server comprises: memory; one or more hardware processors coupled to the memory; and one or more computer readable storage media storing instructions that, when loaded into the memory, cause the one or more hardware processors to perform operations comprising: receiving a request to debug the host application associated with a tenant user; responsive to the request, deploying an application runtime environment comprising an application container encapsulating the host application associated with the tenant user and a debugger container encapsulating a debugging software running on the application server, wherein the application container and the debugger container share an environment configuration associated with the application runtime environment; setting at least a breakpoint in source code of the host application through a user interface of the debugging software; running the host application associated with the tenant user in the application runtime environment; and evaluating an expression entered through the user interface of the debugging software after the host application associated with the tenant user hits the breakpoint.

Example 12. The system of Example 11, wherein the environment configuration comprises scope variables which define in which parts of the source code of the host application the breakpoint is allowed to be set.

Example 13. The system of any one of examples 11-12, wherein evaluating the expression comprises evaluating a variable defined in the source code and returning a value of the variable when the host application hits the breakpoint.

Example 14. The system of any one of examples 11-13, wherein evaluating the expression comprises prohibiting changing data of the tenant user.

Example 15. The system of any one of examples 11-14, wherein the operations further comprise authenticating a support member who has access to the application runtime environment, wherein authenticating comprises evaluating a credential of the support member based on the request from the tenant user.

Example 16. The system of example 15, wherein evaluating the expression comprises prohibiting changing access privilege of the support member .

Example 17. The system of any one of examples 11-16, wherein the operations further comprise restricting the breakpoint to the tenant user such that the host application run by other tenant users does not stop at the breakpoint.

Example 18. The system of any one of examples 11-17, wherein the operations further comprise deleting the application runtime environment when a predefined duration elapses since deploying the application runtime environment.

Example 19. The system of any one of examples 11-18, wherein the operations further comprise logging the expression in a log file; and responsive to a request to audit debugging activity of a support member, providing the expression from the log file.

Example 20. One or more non-transitory computer-readable media having encoded thereon computer-executable instructions causing one or more processors to perform a method comprising: in a multitenant cloud environment where an application server maintains a host application shared by multiple tenant users, receiving a request to debug the host application associated with a tenant user; responsive to the request, deploying an application runtime environment comprising an application container encapsulating the host application associated with the tenant user and a debugger container encapsulating a debugging software running on the application server, wherein the application container and the debugger container share an environment configuration associated with the application runtime environment; authenticating a support member who has access to the application runtime environment based on the request from the tenant user; setting at least a breakpoint in source code of the host application through a user interface of the debugging software; restricting the breakpoint to the tenant user such that the host application run by other tenant users does not stop at the breakpoint; running the host application associated with the tenant user in the application runtime environment; evaluating an expression entered through the user interface of the debugging software after the host application associated with the tenant user hits the breakpoint; deleting the application runtime environment when a predefined duration elapses since deploying the application runtime environment; and logging the expression in a log file, wherein evaluating the expression comprises prohibiting changing data of the tenant user and prohibiting changing access privilege of the support member.

Example 21—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
in a multitenant cloud environment where an application server maintains a host application shared by multiple tenant users, receiving a request to debug the host application associated with a tenant user;
responsive to the request, deploying an application runtime environment comprising an application container encapsulating the host application associated with the tenant user and a debugger container encapsulating a debugging software running on the application server, wherein the application container and the debugger container share an environment configuration associated with the application runtime environment;
setting at least a breakpoint in source code of the host application through a user interface of the debugging software, wherein the breakpoint functions during runtime of the host application;
running the host application;
causing a provisional pause at the breakpoint during runtime of the host application;
responsive to determining that the host application is run by the tenant user, sustaining the provisional pause and evaluating an expression entered through the user interface of the debugging software; and
responsive to determining that the host application is run by another tenant user, removing the provisional pause so that the host application executes past the breakpoint.

2. The method of claim 1, wherein the environment configuration comprises scope variables which define in which parts of the source code of the host application the breakpoint is allowed to be set.

3. The method of claim 1, wherein evaluating the expression comprises evaluating a variable defined in the source code and returning a value of the variable when the host application hits the breakpoint.

4. The method of claim 1, wherein evaluating the expression comprises prohibiting changing data of the tenant user.

5. The method of claim 1, further comprising authenticating a support member who has access to the application runtime environment, wherein authenticating comprises evaluating a credential of the support member based on the request from the tenant user.

6. The method of claim 5, wherein evaluating the expression comprises prohibiting changing access privilege of the support member.

7. The method of claim 1, wherein the debugger container further encapsulates a debug adaptor, wherein the debugging software interacts with the host application by calling debugging functions provided by the debug adaptor, wherein at least some of the debugging functions of the debug adaptor are disabled by the debugging software.

8. The method of claim 1, further comprising presenting a call stack of the running host application in the user interface of the debugging software after the host application hits the breakpoint.

9. The method of claim 1, further comprising deleting the application runtime environment when a predefined duration elapses since deploying the application runtime environment.

10. The method of claim 1, further comprising logging the expression in a log file; and
responsive to a request to audit debugging activity of a support member, providing the expression from the log file.

11. The method of claim 1, wherein the environment configuration specifies the tenant user and a support member so that only the specified support member is allowed to debug the host application associated with the tenant user and the specified support member is prohibited from accessing data of other tenant users.

12. A computing system, comprising:
an application server maintaining a host application shared by multiple tenant users, wherein the application server comprises:
memory;
one or more hardware processors coupled to the memory; and
one or more computer readable storage media storing instructions that, when loaded into the memory, cause the one or more hardware processors to perform operations comprising:
receiving a request to debug the host application associated with a tenant user;
responsive to the request, deploying an application runtime environment comprising an application container encapsulating the host application associated with the tenant user a debugger container encapsulating a debugging software running on the application server, wherein the application container and the debugger container share an environment configuration associated with the application runtime environment;
setting at least a breakpoint in source code of the host application through a user interface of the debugging software, wherein the breakpoint functions during runtime of the host application;
running the host application;
causing a provisional pause at the breakpoint during runtime of the host application;
responsive to determining that the host application is run by the tenant user, sustaining the provisional pause and evaluating an expression entered through the user interface of the debugging software; and
responsive to determining that the host application is run by another tenant user, removing the provisional pause so that the host application executes past the breakpoint.

13. The system of claim 12, wherein the environment configuration comprises scope variables which define in which parts of the source code of the host application the breakpoint is allowed to be set.

14. The system of claim 12, wherein evaluating the expression comprises evaluating a variable defined in the source code and returning a value of the variable when the host application hits the breakpoint.

15. The system of claim 12, wherein evaluating the expression comprises prohibiting changing data of the tenant user.

16. The system of claim 12, wherein the operations further comprise authenticating a support member who has access to the application runtime environment, wherein authenticating comprises evaluating a credential of the support member based on the request from the tenant user.

17. The system of claim 16, wherein evaluating the expression comprises prohibiting changing access privilege of the support member.

18. The system of claim 12, wherein the debugger container further encapsulates a debug adaptor, wherein the debugging software interacts with the host application by calling debugging functions provided by the debug adaptor, wherein at least some of the debugging functions of the debug adaptor are disabled by the debugging software.

19. The system of claim 12, wherein the operations further comprise deleting the application runtime environment when a predefined duration elapses since deploying the application runtime environment.

20. The system of claim 12, wherein the operations further comprise logging the expression in a log file; and
responsive to a request to audit debugging activity of a support member, providing the expression from the log file.

21. One or more non-transitory computer-readable media having encoded thereon computer-executable instructions causing one or more processors to perform a method comprising:
in a multitenant cloud environment where an application server maintains a host application shared by multiple tenant users, receiving a request to debug the host application associated with a tenant user;
responsive to the request, deploying an application runtime environment comprising an application container encapsulating the host application associated with the tenant user a debugger container encapsulating a debugging software running on the application server, wherein the application container and the debugger container share an environment configuration associated with the application runtime environment;
authenticating a support member who has access to the application runtime environment based on the request from the tenant user;
setting at least a breakpoint in source code of the host application through a user interface of the debugging software, wherein the breakpoint functions during runtime of the host application;
running the host application;
causing a provisional pause at the breakpoint during runtime of the host application;
responsive to determining that the host application is run by the tenant user, sustaining the provisional pause and evaluating an expression entered through the user interface of the debugging software;
responsive to determining that the host application is run by another tenant user, removing the provisional pause so that the host application executes past the breakpoint;
deleting the application runtime environment when a predefined duration elapses since deploying the application runtime environment; and
logging the expression in a log file,
wherein evaluating the expression comprises prohibiting changing data of the tenant user and prohibiting changing access privilege of the support member.

* * * * *